3,059,535
ZOOM LENS SYSTEM
Arthur Cox, Park Ridge, and Walter J. Johnson, Mundelein, Ill., assignors to Bell & Howell Company, Chicago, Ill., a corporation of Illinois
Filed May 26, 1961, Ser. No. 112,841
1 Claim. (Cl. 88—57)

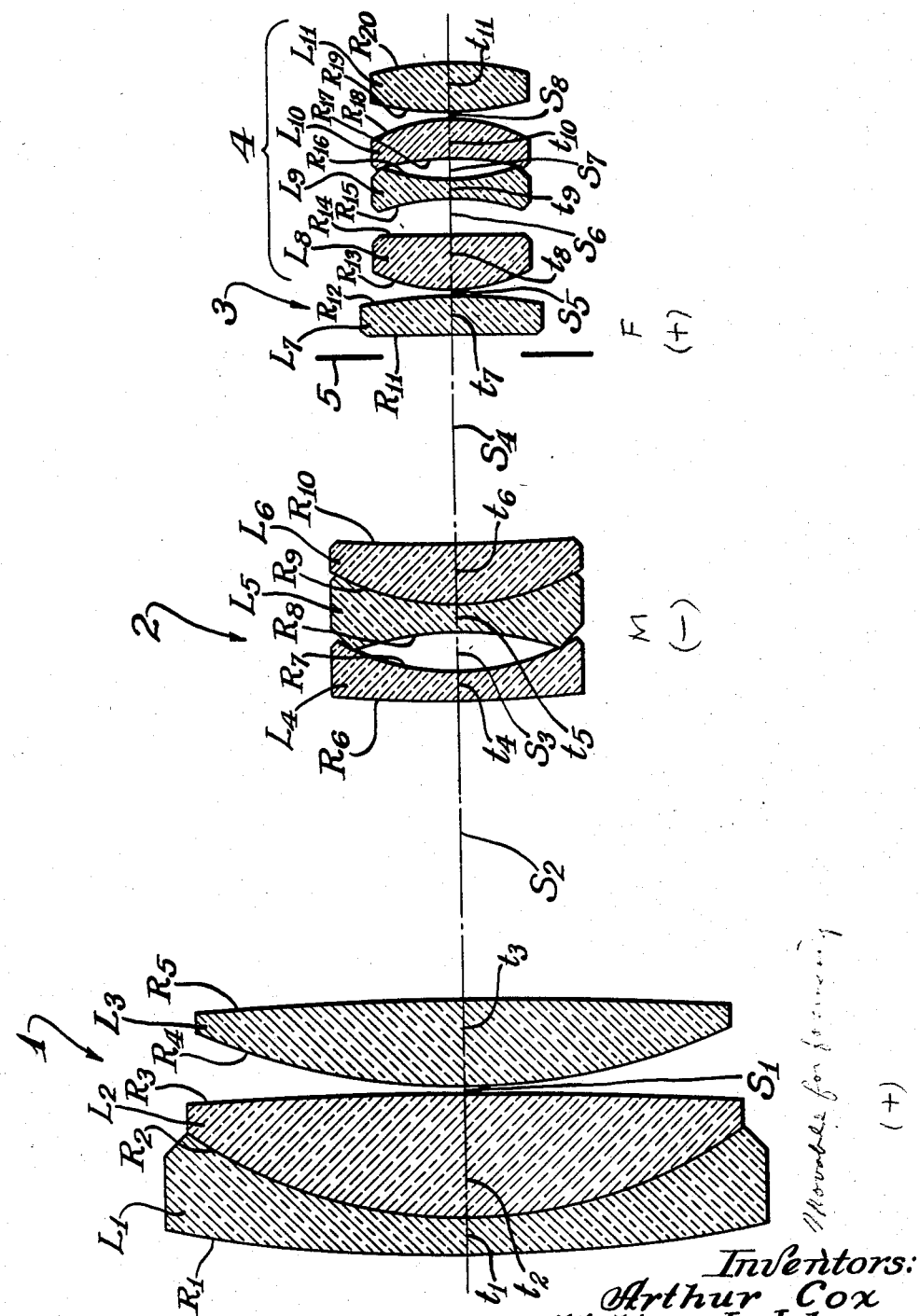

This invention relates to a zoom lens, and more particularly to a zoom lens highly corrected over a large range of magnification.

An object of the invention is to provide a zoom lens highly corrected over a large range of magnification.

Another object of the invention is to provide an inexpensive zoom lens highly corrected over a magnification range of at least two and one-half to one.

It is to be understood that the terms "front" and "rear" as herein used refer to the ends of the objective respectively nearer the long and short conjugates thereof.

In the accompanying drawings forming a part hereof, the single FIGURE shown therein illustrates a zoom lens described herein and embodying the invention, and showing the lens in the intermediate variable equivalent focal length adjustment thereof.

The invention provides a zoom lens or variable equivalent focal length objective having a front positive member, an intermediate negative member and a rear positive member. The front positive member is movable non-linearly during zooming and preferably is adjustable for focusing also. The intermediate negative member is movable linearly for zooming, and the rear member is fixed. Preferably, the front member includes a front positive doublet and a rear positive singlet, the intermediate negative member has a front negative meniscus singlet and a biconcave rear doublet, and the rear member comprises a rear prime lens group and a singlet in front of the prime lens group and a stop in front of the last mentioned singlet and the last mentioned singlet forming an afocal system with the front and intermediate members.

Referring now in detail to the drawings, the zoom lens shown therein includes a front lens member 1, an intermediate lens member 2 and a rear lens member made up of a component or member 3 and a prime lens or member 4 with a stop 5 positioned between the members 2 and 3. The members 3 and 4 are stationary or fixed, and, during zooming, the member 1 is moved non-linearly relative thereto, first moving to the left from its extreme telephoto position until it reaches the position thereof shown in the drawing, which is the intermediate zooming position, and then moves to the right to its extreme wide angle position. The member 1 also is adjustable relative to the members 2, 3 and 4 for focusing for different object distances, and any focus of the zoom lens for any setting of the member 1 is correct for all zooming positions. During zooming, the member 2 is movable linearly relative to the member 1 from its extreme telephoto position to its extreme wide angle position through its median or intermediate position which is shown in the drawings. A suitable lens mounting and zooming structure for the objectives disclosed herein is disclosed and claimed in co-pending application Serial No. 854,732 filed November 23, 1959, by F. W. Mellberg and assigned to the common assignee.

The front member 1 comprises a front biconvex, cemented doublet $L_1$—$L_2$ and a rear singlet $L_3$ predominantly convex forwardly and spaced closely to the doublet $L_1$—$L_2$, and having a dispersive internal contact surface $R_2$. The mean refractive index of the lens $L_1$ exceeds that of the lens $L_2$. The linearly movable negative zooming member 2 comprises a front negative meniscus singlet $L_4$ convex forwardly and a rear biconcave, cemented doublet component $L_5$—$L_6$ predominantly concave forwardly. The doublet $L_5$—$L_6$ has a collective internal contact surface $R_9$ and the mean refractive index of the lens $L_6$ exceeds that of the lens $L_5$. The stationary member 3 is a positive singlet $L_7$ predominantly convex rearwardly, and forms an afocal lens system with the members 1 and 2, it being possible to use this afocal system as an attachment or built in with the prime lens member 4 or with other prime lenses. The prime lens member 4 includes a front positive singlet $L_8$ predominantly convex forwardly, a biconcave singlet $L_9$ predominantly concave forwardly, a positive meniscus singlet $L_{10}$ concave forwardly and a rear biconvex singlet $L_{11}$. The prime lens is a 15.2 mm. f/1.8 objective. The lenses $L_1$ to $L_{11}$ have spherical surfaces or radii of curvature $R_1$ to $R_{20}$, axial thicknesses $t_1$ to $t_{11}$ and axial separations $s_1$ to $s_8$.

The equivalent focal length of the lens is variable over at least two and one-half to one range of magnification while maintaining a high degree of optical correction for a large aperture of at least f/1.9 throughout the range.

A preferred example of the zoom lens having a magnification range of about two and one-half to one is constructed in conformity with the following tables wherein dimensions are in terms of inches and the refractive indices for the sodium D line and the Abbe dispersion numbers are respectively designated at $n_d$ and V:

[E.F.L.=.983 Telephoto, .592 Median, .393 Wide Angle. f/1.9. B.F.L.=.4093]

|       | R               | t, s                                                          | $n_d$       | V      |
|-------|-----------------|---------------------------------------------------------------|-------------|--------|
| $L_1$ | $R_1=+2.504$    | $t_1=.100$                                                    | $n_d=1.720$ | V=29.3 |
|       | $R_2=+1.111$    |                                                               |             |        |
| $L_2$ |                 | $t_2=.300$                                                    | $n_d=1.611$ | V=58.8 |
|       | $R_3=-10.000$   | $s_1=.020$                                                    |             |        |
|       | $R_4=+2.825$    |                                                               |             |        |
| $L_3$ |                 | $t_3=.150$                                                    | $n_d=1.611$ | V=58.8 |
|       | $R_5=-10.000$   | $s_2=\begin{cases}.800\text{ Telephoto}\\.500\text{ Median}\\.083\text{ Wide Angle}\end{cases}$ |             |        |
|       | $R_6=+3.049$    |                                                               |             |        |
| $L_4$ |                 | $t_4=.070$                                                    | $n_d=1.620$ | V=60.3 |
|       | $R_7=+.848$     | $s_3=.125$                                                    |             |        |
|       | $R_8=-1.000$    |                                                               |             |        |
| $L_5$ |                 | $t_5=.070$                                                    | $n_d=1.620$ | V=60.3 |
|       | $R_9=+.741$     |                                                               |             |        |
| $L_6$ |                 | $t_6=.160$                                                    | $n_d=1.751$ | V=27.7 |
|       | $R_{10}=+4.916$ | $s_4=\begin{cases}.100\text{ Telephoto}\\.580\text{ Median}\\.873\text{ Wide Angle}\end{cases}$ |             |        |
|       | $R_{11}=$Plano  |                                                               |             |        |
| $L_7$ |                 | $t_7=.080$                                                    | $n_d=1.611$ | V=58.8 |
|       | $R_{12}=-1.534$ | $s_5=.005$                                                    |             |        |
|       | $R_{13}=+.386$  |                                                               |             |        |
| $L_8$ |                 | $t_8=.124$                                                    | $n_d=1.700$ | V=47.8 |
|       | $R_{14}=$Plano  | $s_6=.0793$                                                   |             |        |
|       | $R_{15}=-.444$  |                                                               |             |        |
| $L_9$ |                 | $t_9=.045$                                                    | $n_d=1.751$ | V=27.7 |
|       | $R_{16}=+.504$  | $s_7=.0396$                                                   |             |        |
|       | $R_{17}=-1.135$ |                                                               |             |        |
| $L_{10}$ |              | $t_{10}=.104$                                                 | $n_d=1.651$ | V=55.8 |
|       | $R_{18}=-.369$  | $s_8=.0075$                                                   |             |        |
|       | $R_{19}=+.764$  |                                                               |             |        |
| $L_{11}$ |              | $t_{11}=.119$                                                 | $n_d=1.651$ | V=55.8 |
|       | $R_{20}=-.843$  |                                                               |             |        |

While in the above example, the front member 1 is moved non-linearly for focus compensation during zooming, it is also contemplated to have the front member 1 stationary during zooming and achieving the focus compensation during zooming by moving the lens $L_7$ non-linearly. The front member 1 preferably would still be adjustable for focusing purposes but not during zooming operations.

While the invention is thus described, it is not wished to be limited to the precise details described, as changes may be readily made without departing from the spirit of the invention.

What is claimed is:

A zoom lens, constructed in substantial compliance with the following table in which dimensions are in terms of inches, and proceeding from front to rear $L_1$ to $L_{11}$ designate the lenses, $R_1$ to $R_{20}$ the radii of curvature of the surfaces, $t_1$ to $t_{11}$ the axial thicknesses, $s_1$ to $s_8$ the axial separations, $n_d$ the indices of refraction for the sodium D line and V the Abbe dispersion numbers:

| | | | | |
|---|---|---|---|---|
| $L_1$ | $R_1 = +2.504$ | $t_1 = .100$ | $n_d = 1.720$ | $V = 29.3$ |
| $L_2$ | $R_2 = +1.111$ | $t_2 = .300$ | $n_d = 1.611$ | $V = 58.8$ |
| | $R_3 = -10.000$ | $s_1 = .020$ | | |
| $L_3$ | $R_4 = +2.825$ | $t_3 = .150$ | $n_d = 1.611$ | $V = 58.8$ |
| | $R_5 = -10.000$ | $s_2 = \begin{cases} .800 \text{ Telephoto} \\ .500 \text{ Median} \\ .083 \text{ Wide Angle} \end{cases}$ | | |
| $L_4$ | $R_6 = +3.949$ | $t_4 = .070$ | $n_d = 1.620$ | $V = 60.3$ |
| | $R_7 = +.848$ | $s_3 = .125$ | | |
| | $R_8 = -1.000$ | | | |
| $L_5$ | $R_9 = +.741$ | $t_5 = .070$ | $n_d = 1.620$ | $V = 60.3$ |
| $L_6$ | $R_{10} = +4.916$ | $t_6 = .160$ | $n_d = 1.751$ | $V = 27.7$ |
| | | $s_4 = \begin{cases} .100 \text{ Telephoto} \\ .580 \text{ Median} \\ .873 \text{ Wide Angle} \end{cases}$ | | |
| $L_7$ | $R_{11} = \text{Plano}$ | $t_7 = .080$ | $n_d = 1.611$ | $V = 58.8$ |
| | $R_{12} = 1.534$ | $s_5 = .005$ | | |
| $L_8$ | $R_{13} = +.386$ | $t_8 = .124$ | $n_d = 1.700$ | $V = 47.8$ |
| | $R_{14} = \text{Plano}$ | $s_6 = .0793$ | | |
| $L_9$ | $R_{15} = -.444$ | $t_9 = .045$ | $n_d = 1.751$ | $V = 27.7$ |
| | $R_{16} = +.504$ | $s_7 = .0396$ | | |
| $L_{10}$ | $R_{17} = -1.135$ | $t_{10} = .104$ | $n_d = 1.651$ | $V = 55.8$ |
| | $R_{18} = -.369$ | $s_8 = .0075$ | | |
| $L_{11}$ | $R_{19} = +.764$ | $t_{11} = .119$ | $n_d = 1.651$ | $V = 55.8$ |
| | $R_{20} = -.843$ | | | |

No references cited.